(12) United States Patent
Karlgaard et al.

(10) Patent No.: US 11,886,856 B2
(45) Date of Patent: Jan. 30, 2024

(54) FIRMWARE UPDATE FOR A PALLET OF DEVICES

(71) Applicant: Landis+Gyr Innovations, Inc., Alpharetta, GA (US)

(72) Inventors: Matt Karlgaard, Brainerd, MN (US); Keith Mario Torpy, Sydney (AU); David Bain, Buckworth (GB); Mohammad Malas, Peterborough (GB); Bruno Benedetti, Rotkreuz (CH)

(73) Assignee: Landis+Gyr Technology, Inc., Alpharetta, GA (US)

( * ) Notice: Subject to any disclaimer, the term of this patent is extended or adjusted under 35 U.S.C. 154(b) by 527 days.

(21) Appl. No.: 17/108,341

(22) Filed: Dec. 1, 2020

(65) Prior Publication Data

US 2022/0171609 A1   Jun. 2, 2022

(51) Int. Cl.
*G06F 9/445* (2018.01)
*G06F 8/65* (2018.01)
*G06F 1/3287* (2019.01)
*G06K 7/10* (2006.01)
*G06K 19/07* (2006.01)
*G06Q 30/018* (2023.01)
*G06Q 50/28* (2012.01)

(52) U.S. Cl.
CPC .............. *G06F 8/65* (2013.01); *G06F 1/3287* (2013.01); *G06K 7/10158* (2013.01); *G06K 7/10297* (2013.01); *G06K 7/10336* (2013.01); *G06K 19/0709* (2013.01); *G06K 19/0723* (2013.01); *G06Q 30/0185* (2013.01); *G06Q 50/28* (2013.01); *G06K 2007/10504* (2013.01)

(58) Field of Classification Search
CPC ...... B65D 2590/0083; H04L 2209/805; H04B 17/318; H04M 1/6091; H04M 2250/04; G08B 7/06; H04W 4/021; H04W 4/80; H04W 84/12
USPC .................................................. 717/168–178
See application file for complete search history.

(56) References Cited

U.S. PATENT DOCUMENTS

| 10,740,576 | B2 * | 8/2020 | Burch, V | G06K 7/10415 |
| 2021/0136515 | A1 * | 5/2021 | Zhang | H04W 4/023 |
| 2021/0274315 | A1 * | 9/2021 | Daoura | H04W 4/06 |

* cited by examiner

*Primary Examiner* — Chuck O Kendall
(74) *Attorney, Agent, or Firm* — Kilpatrick Townsend & Stockton LLP

(57) ABSTRACT

A method for providing data to a group of devices on a pallet includes: positioning a set of NFC antennas at different locations around a perimeter of the pallet, each antenna of the set of NFC antennas being configured to surround the pallet; broadcasting, by an NFC reader/writer utilizing the set of NFC antennas, an identification command simultaneously to the group of devices on the pallet, each device of the group of devices including an NFC tag storing a unique ID indicator; receiving, by the NFC reader/writer, unique ID indicators from each device of the group of devices that receives the identification command, transmitting, by the NFC reader/writer, individual commands to each device of the group of devices to enable energy harvesting by the NFC tag. The energy harvested by each device provides power to operate a processor and a nonvolatile memory of the device in a low power mode.

20 Claims, 8 Drawing Sheets

FIRMWARE UPDATE FOR A PALLET OF DEVICES

BACKGROUND

Unless otherwise indicated herein, the materials described in this section are not prior art to the claims in this application and are not admitted to be prior art by inclusion in this section.

After electrical and/or electronic devices are manufactured, they may be stored in the factory or a warehouse for periods of time, possibly weeks, prior to being shipped to customers. The devices may be packaged for distribution, and the packaged devices may be stacked on pallets awaiting shipment. A pallet may contain tens or hundreds of packaged devices. The devices may be programmable devices. For example, the devices may include firmware that controls operation of the devices.

In some cases, during the time the pallets of devices are awaiting shipment, updates for the device firmware may be developed. In order to provide the devices with the most up to date firmware to customers, the firmware must be written to the device memory. To update firmware in the factory or warehouse, a pallet may be unwrapped, and each device individually connected to a wired interface to provide power to the device and to transfer a firmware image. Unwrapping and rewrapping a pallet of devices can make the update process tedious and expensive.

SUMMARY

Systems and methods for updating firmware and/or otherwise providing data to multiple devices in a pallet without unwrapping the pallet or physically connecting to the devices are provided.

According to various aspects there is provided a method for providing data to a group of devices on a pallet. In some aspects, the method may include: positioning a set of near field communication (NFC) antennas at different locations around a perimeter of the pallet, each antenna of the set of NFC antennas being configured to surround the pallet; broadcasting, by an NFC reader/writer utilizing the set of NFC antennas, an identification command simultaneously to the group of devices on the pallet, each device of the group of devices including an NFC tag storing a unique identification (ID) indicator; receiving, by the NFC reader/writer, unique ID indicators from each device of the group of devices that receives the identification command; transmitting, by the NFC reader/writer, individual commands to each device of the group of devices based on the unique ID indicator to enable energy harvesting by the NFC tag, wherein NFC tags for each device of the group of devices harvests energy from transmissions by the NFC reader/writer, wherein energy harvested by each device provides power to operate a processor of the device and a nonvolatile memory of the device in a low power mode; broadcasting, by the NFC reader/writer, data to the group of devices, wherein the data is stored in a memory of the NFC tag of each of the devices; and transmitting, by the NFC reader/writer, a verification message to verify that the data was successfully received by interrogating each device individually based on the unique ID indicator.

In response to determining that the data was not successfully transferred to a device, the NFC reader may retransmit the data to the device based on the unique ID indicator of the device. Each device may enter a sleep mode between communications with the NFC reader/writer to conserve power. The transferred data may be a full firmware image or full configuration update for the device, or a differential firmware image or partial configuration update for the device.

Each antenna of the set of NFC antennas may be sequentially energized or may be concurrently energized to communicate with the group of devices on the pallet. The set of NFC antennas may be repositioned along a dimension of the pallet to communicate with a different group of devices on the pallet.

The devices may be loaded on the pallet with an antenna of the NFC tag of each device in a plane parallel to an antenna of the set of NFC antennas. The devices loaded on the pallet may be electric meters, gas meters, water meters, or other products that can be integrated with an NFC tag.

According to various aspects there is provided a system for providing data to multiple devices on a pallet. In some aspects, the system may include a set of near field communication (NFC) antennas positioned at different locations around a perimeter of the pallet, each antenna of the set of NFC antennas being configured to surround the pallet; and an NFC reader/writer in communication with the set of NFC antennas.

The NFC reader/writer configured to: broadcast, utilizing the set of NFC antennas, an identification command simultaneously to the multiple devices on the pallet, each of the multiple devices including an NFC tag storing a unique identification (ID) indicator; transmit individual commands to each of the multiple devices based on the unique ID indicator to enable energy harvesting by the NFC tag, wherein NFC tags for each of the multiple devices harvest energy from transmissions by the NFC reader/writer, wherein energy harvested by each device provides power to operate a processor of the device and a nonvolatile memory of the device in a low power mode; broadcast data to the multiple devices, wherein the data is stored in a memory of the NFC tag, and the stored data is transferred to a nonvolatile memory of the device; and transmit a verification message to verify that the data was successfully received by interrogating each device individually based on the unique ID indicator. Each antenna of the set of NFC antennas may be a loop-type antenna or a coil-type antenna.

The NFC reader/writer may be further configured to: determine, based on a response to the verification message, that the data was not successfully transferred to a device; and retransmit the data to the device based on the unique ID indicator of the device. The transferred data may be a full firmware image or full configuration update for the device, or a differential firmware image or partial configuration update for the device.

Each antenna of the set of NFC antennas may be sequentially energized or may be concurrently energized to communicate with the group of devices on the pallet. The set of NFC antennas may be repositioned along a dimension of the pallet to communicate with a different group of devices on the pallet.

The devices may be loaded on the pallet with an antenna of the NFC tag of each device in a plane parallel to an antenna of the set of NFC antennas. The devices loaded on the pallet may be electric meters, gas meters, water meters, or other products that can be integrated with an NFC tag.

Numerous benefits are achieved by way of the various embodiments over conventional techniques. For example, the various embodiments provide apparatuses and methods that can be used to update firmware and configuration in programmable of devices that have already been palletized for shipment. In some embodiments, near field communication (NFC) may be used to update device firmware and/or configuration for a pallet of devices without unpackaging the devices. These and other embodiments along with many of its advantages and features are described in more detail in conjunction with the text below and attached figures.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Programmable electrical and/or electronic devices, for example, but not limited to, electric meters, gas meters, water meters, or other products that can be integrated with an NFC tag, may include firmware that controls device operation as well as programmable configuration settings. The firmware and configuration settings may be programmed on a nonvolatile memory device, for example, but not limited to, flash memory, Electrically Erasable and Programmable Read Only Memory (EEPROM), etc., of the device. The nonvolatile memory device may be part of the device processor or may be a separate nonvolatile memory device. The nonvolatile memory device may be referred to herein as the internal memory of the device. Devices may be programmed during manufacturing or testing to verify proper operation. The finished devices may be packaged for distribution, the packaged devices may be stacked on pallets, and the pallets stored in the factory or a warehouse for periods of time before being shipped to customers. A pallet may contain tens or hundreds of packaged devices. For example, a pallet may contain approximately 700 packaged devices.

In some cases, firmware updates or configuration updates may be developed during the time the devices are manufactured and palletized awaiting shipment. In some cases, customer-specific configuration settings may be needed before shipping the devices. In order to avoid unwrapping a pallet to update firmware or configuration settings, embodiments according the present disclosure may provide systems and methods for providing or updating device firmware and configuration settings while the devices remain palletized. The firmware updates may be a differential firmware image where only specified portions of the firmware are changed, or the updates may require a completely new firmware image. Similarly, the configuration updates may be differential updates or completely new configuration settings. Firmware and configuration setting updates may also be provided for peripheral components integrated within the device, for example, but not limited to, Zigbee chips, M-Bus chips, PLC chips, etc. As used herein, both firmware and configuration settings may be referred to as firmware.

Figure 1:
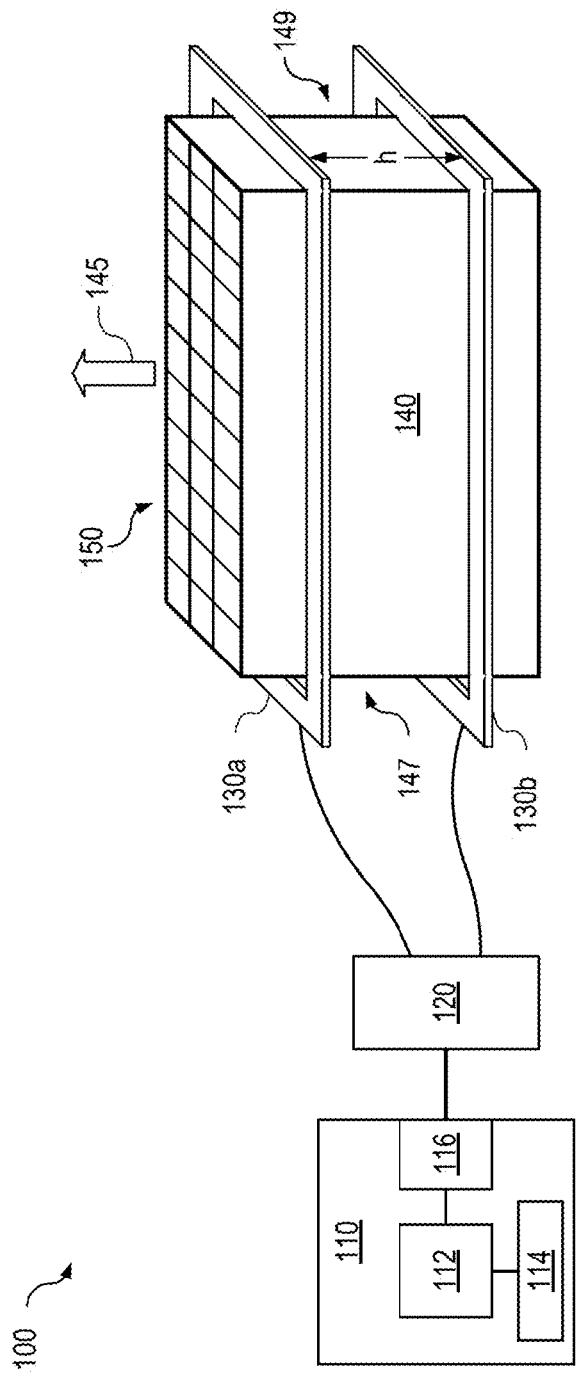
FIG. 1 is diagram illustrating a system for providing data to devices in a pallet according to some aspects of the present disclosure.

Some aspects of the present disclosure may provide a near field communication (NFC) system to communicate with devices incorporating NFC tags while the devices are packaged and palletized. FIG. 1 is a diagram illustrating a system for providing data to devices in a pallet according to some aspects of the present disclosure. The system 100 may be, for example, an NFC system. Referring to FIG. 1, the NFC system may include an NFC reader/writer 110, a power splitter 120, and a set of NFC antennas 130a, 130b. The NFC reader/writer 110 may include a processor 112, a memory 114, and a transceiver 116. The processor 112 may be in electrical communication with the memory 114 and the transceiver 116, and may control overall operation of the NFC reader/writer 110. The memory 114 may store operational programs and data utilized by the processor 112. The transceiver 116 may transmit and receive NFC instructions and data to the devices via the set of NFC antennas 130a, 130b. In some implementations, the NFC reader/writer 110 may be a computer. In some implementations, the NFC reader/writer 110 may be connected to a computer via a network.

The set of NFC antennas 130a, 130b may be positioned around a pallet 140 of packaged devices 150. The devices may be packaged for shipment prior to being palletized. The pallet may contain tens or hundreds of packaged devices 150. For example, a pallet may contain approximately 700 packaged devices 150. Each of the packaged devices 150 may include an NFC tag, a device processor, and a device external memory. In some cases, only a single packaged device may be present.

The NFC reader/writer 110 may send and receive data to and from the packaged devices 150 via an RF field that the NFC reader/writer 110 may generate. The RF field may be a high-power RF field. Power for the NFC tag, the device processor, and the device external memory may be provided by the RF field. Use of the power splitter 120 may enable the NFC reader/writer 110 to select one or a combination of NFC antennas of the set of NFC antennas 130a, 130b to send and receive data to and from the packaged devices 150. The power splitter 120 may further enable selection of one or a combination of NFC antennas of the set of NFC antennas 130a, 130b to send and receive data to and from the packaged devices 150. The RF field may be generated sequentially by each NFC antenna or may be generated concurrently by a combination of NFC antennas.

Each antenna of the set of NFC antennas 130a, 130b may be loop-type antennas or coil-type antennas having internal dimensions sufficient to enable the antenna to be positioned such that the antenna loop or coil surrounds the pallet 140. The set of NFC antennas 130a, 130b may be positionable around a perimeter of the pallet 140 and may be separated from each other by a distance 'h' along a dimension of the pallet 140. The separation distance 'h' may be determined based on the field strength generated by the set of NFC antennas 130a, 130b. In some implementations, the set of NFC antennas 130a, 130b may include two antennas. In some implementations, more than two antennas may be used. The set of NFC antennas 130a, 130b may be energized to transmit data and power to the packaged devices 150 via the RF field. The set of NFC antennas 130a, 130b may also receive data transmitted by the NFC tags. In some cases, the set of NFC antennas 130a, 130b may be able to communicate with all of the packaged devices 150 on a pallet 140 from an initial position of the set of NFC antennas 130a, 130b. In some cases, the set of NFC antennas 130a, 130b may be repositioned to communicate with different portions of the packaged devices 150 on the pallet. In some implementations, a single antenna may be used.

Each of the packaged devices 150 may incorporate an NFC tag and a device external memory. Each of the packaged devices 150 may be positioned on the pallet 140 such that the antenna (e.g., the NFC tag antenna 249) of the NFC tag of the device lies in a plane parallel to the NFC antennas 130a, 130b. For example, referring to FIG. 1, each device may have an NFC tag applied to a front face of the device and may be positioned on the pallet 140 with its front face facing in a direction indicated by the arrow 145. Other configurations may be possible. For example, in some cases it may not be practical to have all devices with their NFC tag antennas facing a plane parallel to the NFC antennas 130a, 130b as illustrated in FIG. 1. In such cases, NFC antennas of the NFC reader/writer may be positionable in multiple orientations. In some implementations, NFC reader/writer antennas other than coil-type antennas or loop-type antennas may be used.

Figure 2:
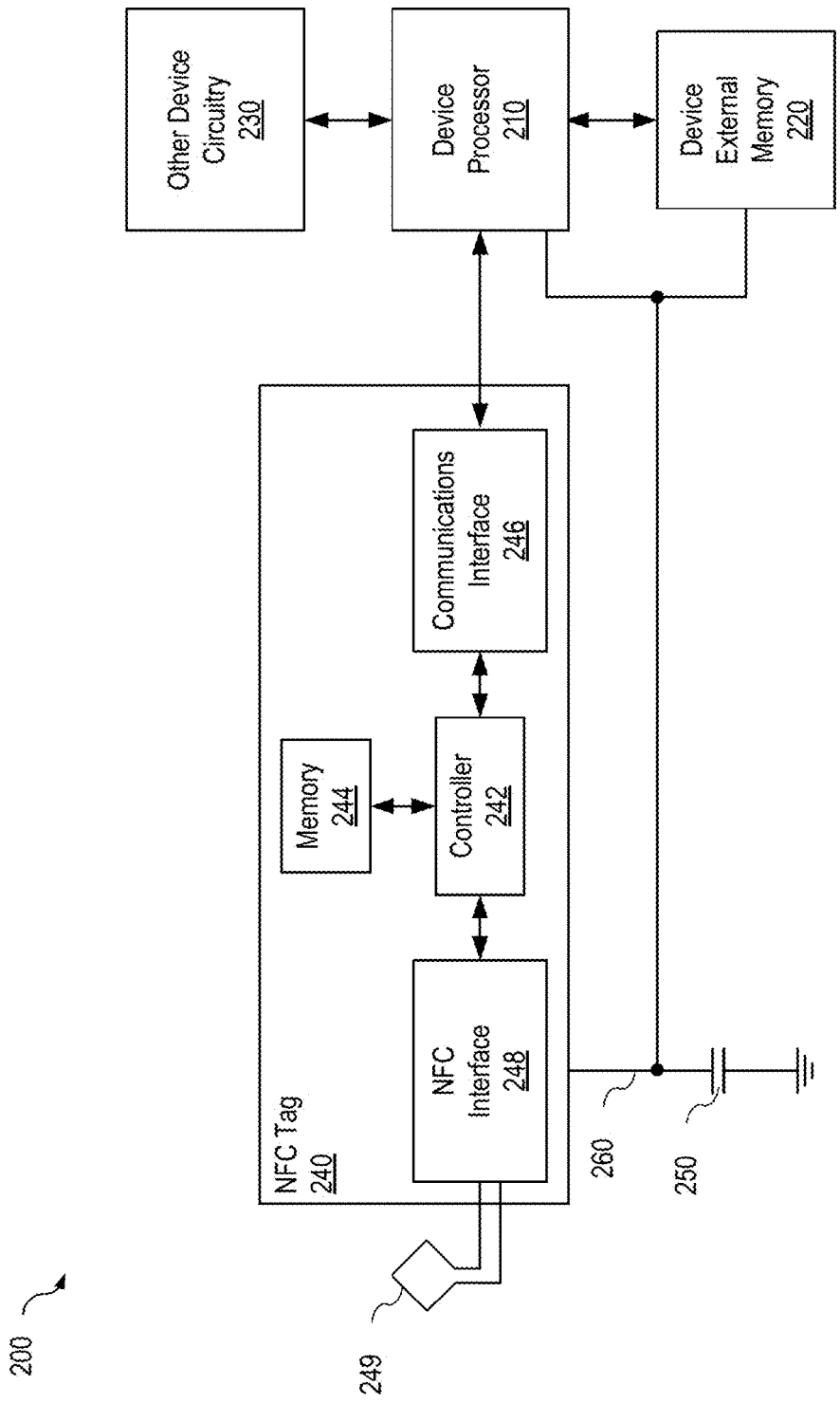
FIG. 2 is a simplified block diagram of a device including an NFC tag according to aspects of the present disclosure.

FIG. 2 is a simplified block diagram of a device 200 including an NFC tag according to aspects of the present disclosure. The device 200 may be, for example, but not limited to, a programmable electric meter, a programmable gas meter, a programmable water meter, or other programmable product that can be integrated with an NFC tag. Referring to FIG. 2, the device 200 may include a device processor 210, a device external memory 220, other device circuitry 230, and NFC tag 240, and a holdup capacitor 250.

The device processor 210 may be, for example, a general purpose processor, a digital signal processor (DSP), an application specific integrated circuit (ASIC), a field programmable gate array (FPGA) or other programmable logic device. The device processor 210 may be operable in a low-power mode that minimizes current consumption. In the low power mode, the device processor 210 may be in electrical communication with the NFC tag 240 and the device external memory 220. The other device circuitry 230 may be unpowered. For example, the device circuitry may include switches that are controllable by the device processor 210 to isolate the other device circuitry 230 such that only the device processor 210 and the device external memory 220 are powered by energy harvested by the NFC tag.

The device external memory 220 may be a nonvolatile memory. For example, the device external memory 220 may be flash memory, Electrically Erasable and Programmable Read Only Memory (EEPROM), or other type of nonvolatile memory. The device external memory 220 may be operable as nonvolatile storage for firmware and/or data received during the NFC communication process. The device external memory 220 may be included in the device and may be a separate memory from an internal device memory (not shown). The internal device memory may be a nonvolatile memory included as part of the device processor 210 or may be a separate nonvolatile memory included as part of the other device circuitry 230. The device external memory 220 may be operable in a low-power mode that minimizes current consumption.

The NFC tag 240 may be incorporated into the device, for example, on a front facing surface of the device when the device is in an installed position. The NFC tag 240 may include a controller 242, a memory 244, a communications interface 246, and NFC interface 248, and an NFC antenna 249. The controller 242 may control overall operation of the NFC tag and may be in electrical communication with the memory 244, the communication interface 246, and the NFC interface 248. In some implementations, the functionality of the NFC tag 240 may be incorporated into the device processor 210.

The NFC interface 248 may harvest energy via the NFC antenna 249 from the RF field provided by the NFC reader/writer, for example, the NFC reader/writer 110. The NFC interface 248 may transmit and receive data to and from the NFC reader/writer 110. The controller 242 may cause data received via the NFC interface 248 to be stored in the memory 244. A unique identification (ID) for the NFC tag may be stored in the memory 244. The unique ID may be, for example, a unique alphanumeric string. The controller 242 may also cause data to be transmitted via the NFC interface 248 to be read from the memory 244.

The communications interface 246 may provide communications between the device processor 210 and the NFC tag 240. For example, the controller 242 may transfer data from the memory 244 to the device processor 210 via the communication interface 246. The device processor 210 may store data, for example, firmware updates or other data, for example, but not limited to, configuration data, received via the communication interface 246 to the device external memory 220.

Power harvested from the RF field generated by the NFC reader/writer 110 may be provided to the holdup capacitor 250, the device processor 210, and the device external memory 220 by the NFC tag 240 via the power line 260. Harvested energy stored by the holdup capacitor 250 may be sufficient to operate the NFC tag 240 as well as the device processor 210 and the device external memory 220 operating in the low power mode. Thus, embodiments of devices according to the present disclosure may utilize the NFC tag 240 with its associated circuitry, the hold-up capacitor 250, and the device external memory 220 to receive and store device firmware updates or configuration updates while the devices are palletized prior to deployment in the field.

Figure 3A:
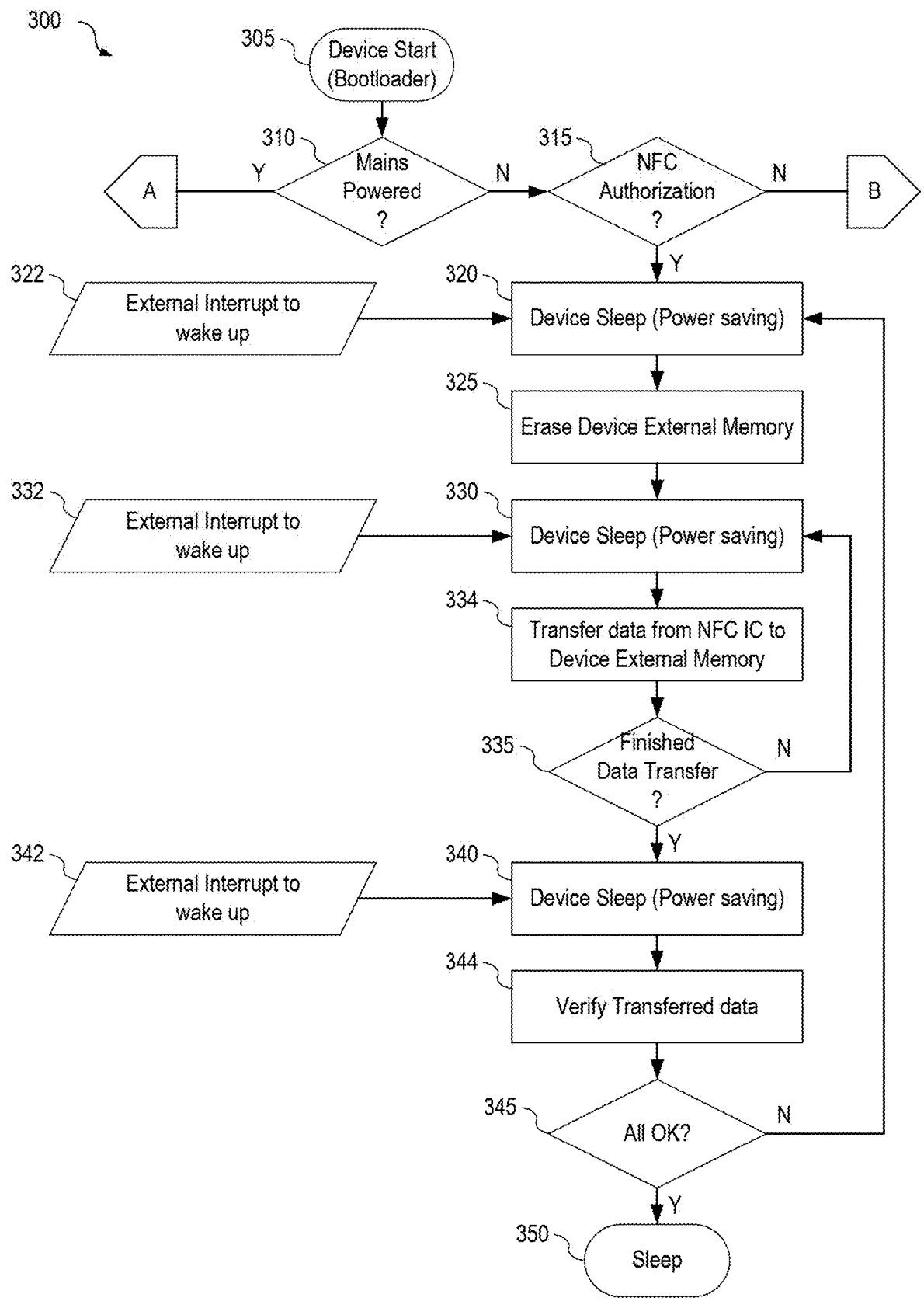
FIGS. 3A and 3B illustrate a process flow for updating a firmware image or configuration for a palletized device according to some aspects of the present disclosure.
Figure 3B:
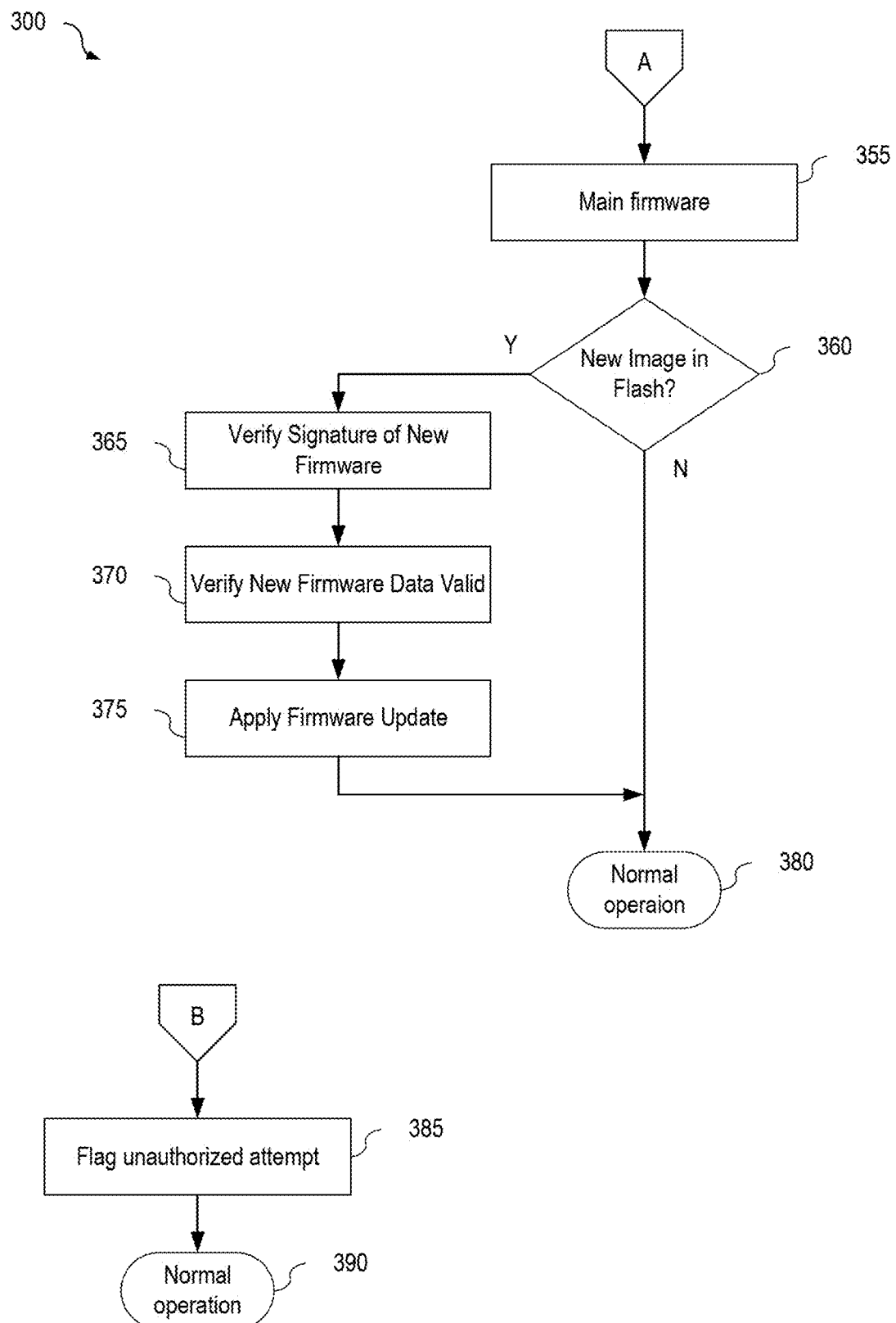

According to some aspects of the present disclosure, the system for providing data to devices in a pallet may be utilized to update firmware or provide other data, for example, but not limited to, configuration data, for devices that have been packaged and palletized without unwrapping the device. FIGS. 3A and 3B illustrate a process flow 300 for updating a firmware image or configuration settings for a palletized device according to some aspects of the present disclosure. Referring to FIG. 3A, at operation 305, when power is applied, the device may start up. A bootloader may initiate device operation. At block 310, it may be determined whether power is being supplied from a power main, for example, from the electric power grid. For example, the device processor (e.g., the device processor 210) may determine whether sufficient power is available to operate in a normal operational mode or whether operation in a low-power mode is necessary.

In response to determining that power is being supplied from the electric power grid (310-Y), at block 355, device operation may begin based on firmware and configuration data already installed in the device. The device processor may operate in a normal operational mode based on the currently installed firmware. The firmware may be a firmware version available during manufacturing and testing of the device. In some cases, the firmware may be a basic version programmed into all devices at time of initial manufacture which can then be updated using the method described.

At block 360, it may be determined whether a new firmware version has been stored in the external device memory (e.g., the external device memory 220). For example, the device processor may determine whether an updated version of firmware is stored in the external device memory, for example, by examining a firmware version number. In response to determining that an updated version of firmware is not stored in the external memory device (360-N), at block 380, the device may begin normal operation.

In response to determining that an updated version of firmware is stored in the external memory device (360 Y), at block 365, the signature of the updated firmware may be verified. For example, the device processor may determine that a digital signature of the version of firmware stored in the external memory device matches the digital signature of the firmware provided by the manufacturer.

At block 370, the updated firmware data may be validated. For example, the device processor may examine the firmware version number, or perform other checks to determine that the updated firmware data is valid. For example, the updated firmware data may be validated using an algorithm, for example, but not limited to, a cyclic redundancy check (e.g., a CRC-32 or other cyclic redundancy check), a 256-bit secure hash algorithm (SHA-256), or other algorithm.

At block 375, the updated firmware may be applied. A bootloader may load the updated firmware.

At block 380, the device processor may begin normal operation according to the updated firmware.

Returning to block 310, in response to determining that power is not being supplied from a power main (310-N), at block 315, the device may determine whether an authorized attempt to update its firmware or configuration via near field communication (NFC) has occurred. For example, validation between the reader and end device such as the passing of a key, SHA-256 validation, etc., may be performed to ensure that only authorized devices can send firmware updates or configuration updates to the devices. In response to determining that an authorized attempt to update its firmware or configuration has not occurred (315-N), at block 385, the device processor may flag an unauthorized attempt, for example, by storing a value in memory, for example, the memory of the NFC tag.

At block 390, the device processor may begin operation in low-power mode according to the currently installed firmware and configuration settings. The low-power mode may be initiated in response to receiving energy from the RF field generated by the NFC reader/writer. In the low-power mode, power may be supplied to the NFC tag (e.g., the NFC tag 240), the device processor, and the device external memory via energy harvesting from the RF field generated by the NFC reader/writer (e.g., the NFC reader/writer 110). When powered by energy harvesting, only the software supporting NFC updates may be executed by the device.

In response to determining that an authorized attempt to update its firmware or configuration has occurred (315-Y), at block 320, the device processor may enter a sleep mode to conserve power until, at block 322, an external interrupt to wake-up is received. The external interrupt may be received from the NFC reader/writer. External interrupts may be received by the NFC tag from the NFC reader/writer via the NFC antenna (e.g., the NFC antenna 249) and the NFC interface (e.g., the NFC interface 248). The external interrupts may be received by the device processor via the communication interface (e.g., the communication interface 246) of the NFC tag.

At block 325, receipt of the external wake-up interrupt may cause the device processor to erase portions of the external device memory. The command that invokes the erase may contain information about the size of the new image. Only a sufficient number of external device memory sectors for storing the new image may be erased.

At block 330, the device processor may again enter a sleep mode to conserve power until, at block 332, an external interrupt to wake-up is received from the NFC reader/writer.

At block 334, the external interrupt may cause the NFC tag controller (e.g., NFC the tag controller 242) and the device processor to transfer firmware update data or configuration update data received by the NFC tag and stored in the NFC tag memory (e.g., the NFC tag memory 244) to the device external memory. For example, the transfer firmware update data or configuration update data may first stored in the internal random access memory (RAM) of the device processor, and then transferred from the RAM to the external memory.

At block 335, it may be determined whether the data transfer to the external memory is finished. The device processor may determine whether all of the data for the firmware update data or configuration update has been transferred. In response to determining that the data transfer has not finished (335-N), the device processor may again enter a sleep mode at block 330 until the controller of the NFC tag resumes transferring data.

In response to determining that the data transfer has finished (335-Y), at block 340, the device processor may again enter a sleep mode to conserve power until, at block 342, an external interrupt to wake-up is received from the NFC reader/writer.

At block 344, the external interrupt may cause the device processor to verify whether all the updated firmware data or configuration data has been successfully received and stored in the external device memory. The processor may perform a check, for example, a checksum validation to verify that the firmware or configuration data is successfully transferred.

At block 345, it may be determined whether the updated firmware data or configuration data has received and stored in the external device memory. In response to determining that the updated firmware data or configuration data has not been received and stored in the external device memory (345-N), the method may be repeated starting at block 320.

In response to determining that the updated firmware data or configuration data has been received and stored in the external memory device (345-Y), at block 350, the device processor may enter a sleep mode until the RF field generated by the NFC reader/writer is removed and the device processor powers down. The device processor may upgrade the firmware or configuration settings after the device is installed and power is provided by a main power source such as the electrical power grid. For security reasons, a signature check of the upgraded firmware or configuration settings may be performed after the device is powered up by the main power source.

When the device powers on with AC power for the first time, for example, when it is installed at a customer location, the device may check its device external memory for a new firmware image or configuration. When the device finds a firmware image or configuration, it may validate the image or configuration. In some cases, the device may perform an internal validation process. In some cases, the device may perform validation over a network, for example an advanced metering infrastructure (AMI) network. If the firmware image or configuration in the device external memory is valid, the device may overwrite its existing firmware image in the internal nonvolatile memory with the image from device external memory. A special bootloader may perform the firmware update. If the firmware image is a differential image, the bootloader may use the existing firmware image along with the changes in the differential image file to create the new firmware image.

Figure 4A:
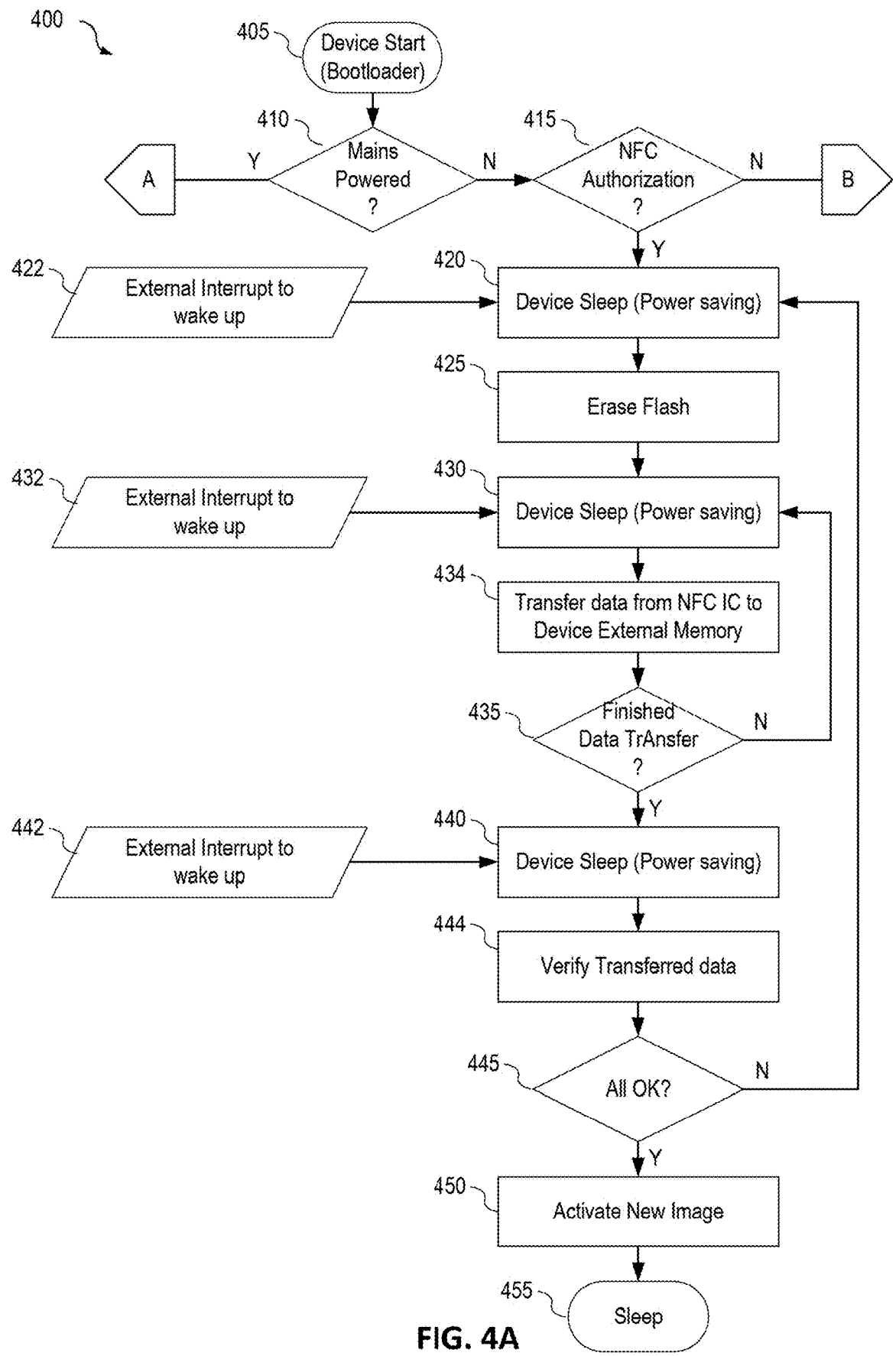
FIGS. 4A and 4B illustrate a process flow for updating and activating a firmware image or configuration for a palletized device according to some aspects of the present disclosure.
Figure 4B:
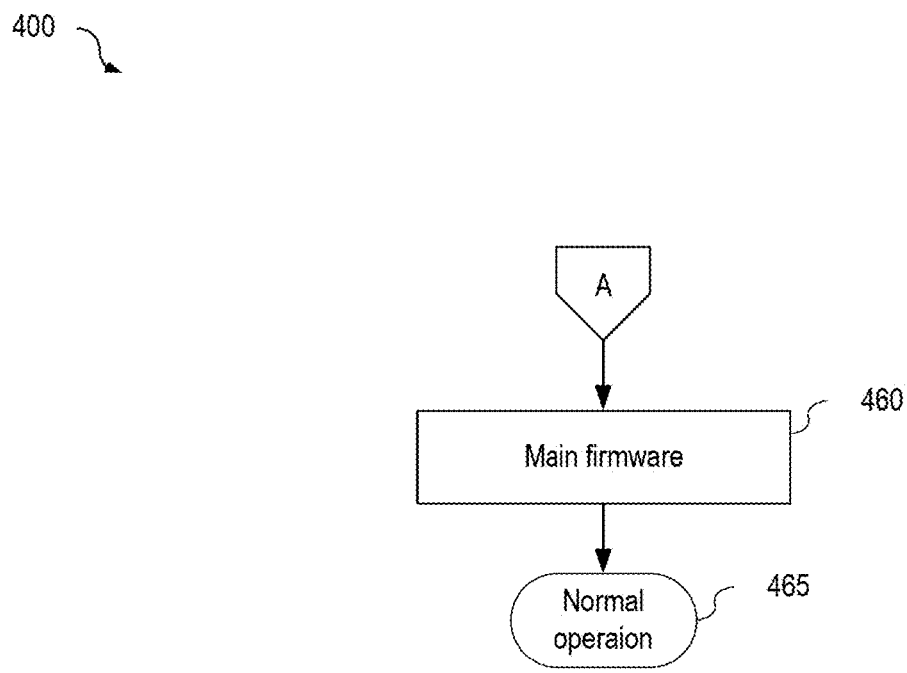
Figure 4B:
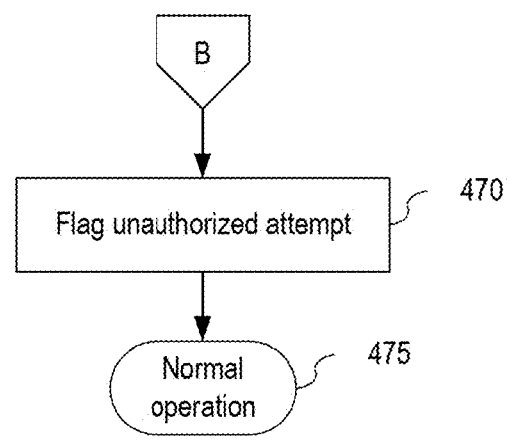

In some implementations, the device may upgrade the firmware or configuration settings while still powered by energy harvesting from the NFC field. FIGS. 4A and 4B illustrate a process flow 400 for updating and activating a firmware image or configuration for a palletized device according to some aspects of the present disclosure. In FIG. 4A, operations 405-445 may be similar to operations 305-345 of the method of FIG. 3 and will not be further described here. In addition, operations 460-465 and 470-475 may be similar to operations 385-390 and will not be further described here.

Beginning at block 445, in response to determining that the updated firmware data or configuration data has been received and stored in the external memory device (445-Y), at block 450, the updated firmware may be activated. In the low power mode while being powered via energy harvesting, a bootloader may install the upgraded firmware or configuration data stored in the external device memory. The processor may perform a check, for example, a checksum validation, for example, an SHA-256 validation, on the updated firmware data or configuration data prior to it being programmed from the external flash to the internal flash to verify that the firmware or configuration data is successfully installed. In the case of a failed checksum validation, the deployment of the new data may be aborted the method may be repeated starting at block 420.

At block 455, the device processor may enter a sleep mode until the RF field generated by the NFC reader/writer is removed and the device processor powers down.

In some embodiments, the device firmware or configuration may be upgraded using the process 300 or the process 400 after a device is installed at a customer location and before mains power is applied to the device. A mobile device, such as a mobile phone, laptop computer, or other mobile device, may communicate with the device via NFC to transfer the data to the device. For example, the firmware or configuration may be updated locally by an installer for each meter as it is being deployed.

Figure 5:
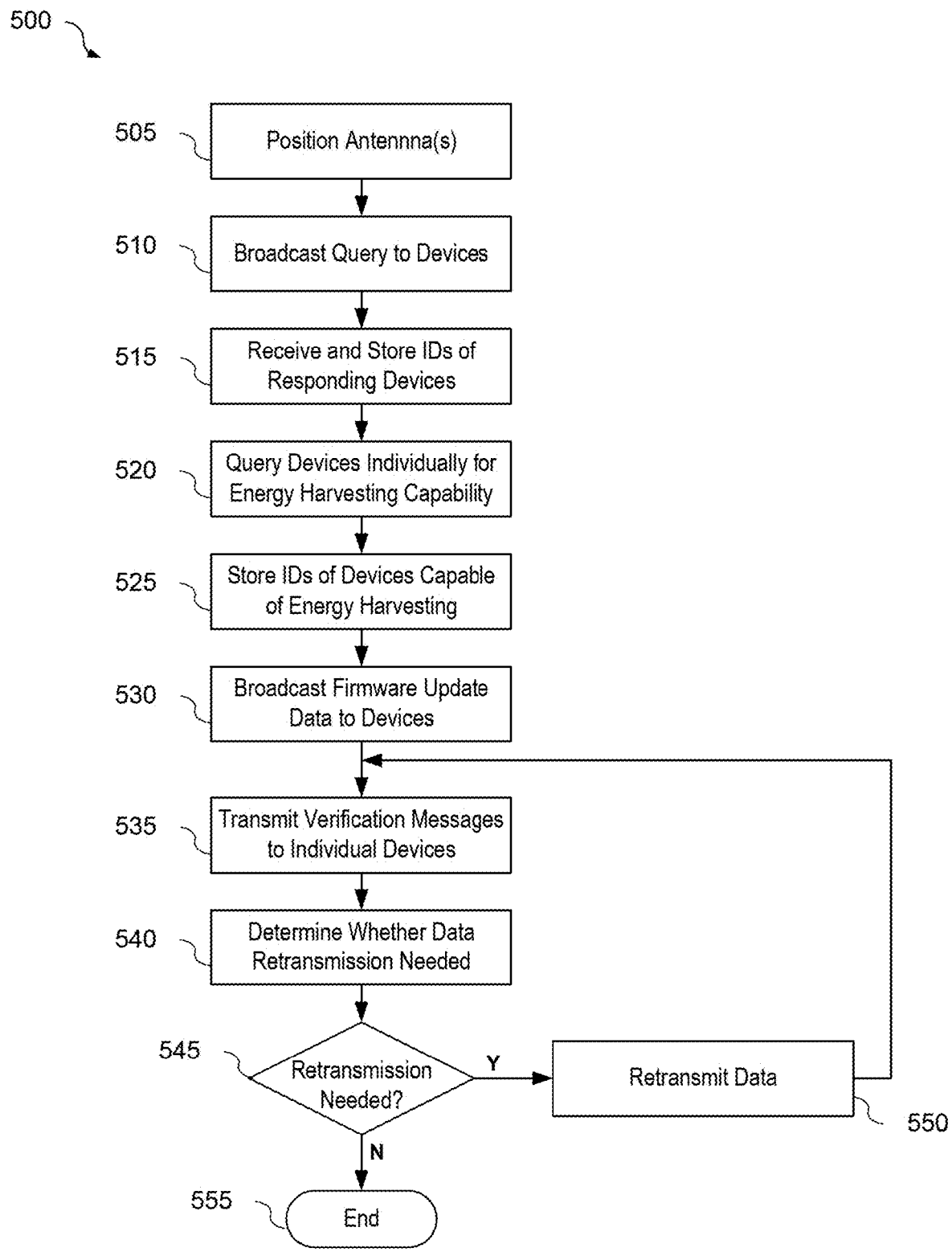
FIG. 5 is a flowchart illustrating an example of a method for updating firmware or configuration for devices in a pallet according to aspects of the present disclosure.

FIG. 5 is a flowchart illustrating an example of a method 500 for updating firmware or configuration for devices in a pallet according to aspects of the present disclosure. Referring to FIG. 5, at block 505, a set of NFC antennas (e.g., the NFC antennas 130a, 130b) may be positioned around a pallet (e.g., the pallet 140) containing multiple packaged devices (e.g., the packaged devices 150). The pallet may contain tens or hundreds of packaged devices. For example, each pallet may contain approximately 700 packaged devices. Each of the packaged devices may include an NFC tag, a device processor, and a device external memory. Each of the packaged devices may be positioned on the pallet such that the NFC tag of the device faces a closest side of the pallet.

Each antenna of the set of NFC antennas may be loop-type or coil-type antennas having internal dimensions sufficient to enable the antenna to be positioned such that the antenna loop or coil surrounds the devices on the pallet. The set of NFC antennas may be positionable around a perimeter of the pallet and may be separated from each other by a distance 'h' along a dimension, for example a height dimension, of the pallet. In some implementations, the set of NFC antennas may include two antennas. In some implementations, more than two antennas may be used. In some cases, the set of NFC antennas may be able to communicate with all of the packaged devices on a pallet from an initial position of the set of NFC antennas. In some cases, the set of NFC antennas may be repositioned to communicate with different portions of the packaged devices on the pallet.

At block 510, a query may be broadcast to the devices on the pallet. The NFC reader/writer may broadcast a query to all of the palletized devices within communication range of the NFC antennas. The broadcast query may request that each device respond with its unique identification (ID).

At block 515, the NFC reader/writer may receive and store the IDs of the responding devices. The NFC reader may receive the unique IDs of devices that successfully received the query. The NFC reader/writer may store the IDs, for example, in a memory (e.g., the memory 114).

At block 520, the NFC reader/writer may individually query the devices for an indication of whether a device is capable of harvesting sufficient energy from the RF field to power the device processor and device external memory. The NFC reader/writer may transmit the status requests addressed to the unique IDs of the devices that previously responded to the broadcast. Each device may perform a self-test to determine an amount of available energy, and may provide a response (e.g., a 1 or 0 indicating capable or not capable) to the query from the reader. The energy harvesting capability may be determined based on configurable energy thresholds.

At block 525, the NFC reader/writer may receive the energy harvesting status from each of the devices. The NFC reader/writer may store, for example in a memory, the energy harvesting status corresponding to each unique device ID. The energy harvesting status may include an indication of whether each unique device ID is capable or incapable of harvesting sufficient energy.

At block 530, the NFC reader/writer may broadcast firmware update data to the devices on the pallet. The NFC reader/writer may continue to broadcast the firmware update data until all of the firmware update data has been transmitted. In some cases, the firmware update data may be a complete new firmware image. In some cases, the firmware update data may be a differential firmware image.

At block 535, the NFC reader/writer may transmit verification messages addressed to individual device IDs. The NFC/reader/writer may address the verification messages only to devices with IDs that previously indicated the capability to harvest sufficient energy to power the device processor and device external memory.

At block 540, it may be determined whether retransmission of data is needed. The NFC reader/writer may receive responses from the individual devices indicating whether all of the transmitted data was successfully received. The NFC reader/writer may determine whether data retransmission is needed for any of the devices. In response to determining that retransmission of data is needed (545-Y), at block 550, the data may be retransmitted specifically targeting devices having the unique IDs that indicated unsuccessful data transmission, and the method may continue at block 535. In some implementations, unsuccessfully received data may be retransmitted via broadcast, and devices that already successfully received the data may ignore the broadcast.

In response to determining that retransmission of data is not needed (545-N), at block 555, the process may end.

In some cases, it may not be possible to communicate with all of the devices on the pallet with the NFC antennas in one position. In such cases, the NFC antennas may be repositioned along a dimension, for example, a height dimension, of the pallet and the method repeated until communication has been successfully achieved with all of the palletized devices. Whether repositioning of the NFC antennas is needed may be determined by several factors, such as the number of antennas, the number of devices needing updating, the dimensions of the pallet, or the height of the loaded pallet, or other factors affecting communication with the devices.

The specific operations illustrated in FIG. 5 provide a particular method for providing data to devices in a pallet according to an embodiment of the present disclosure. Other sequences of operations may also be performed according to alternative embodiments. For example, alternative embodiments of the present disclosure may perform the operations outlined above in a different order. Moreover, the individual operations illustrated in FIG. 5 may include multiple sub-operations that may be performed in various sequences as appropriate to the individual operation. Furthermore, additional operations may be added or removed depending on the particular applications.

For example, in some implementations after determining that a device is capable of energy harvesting, the NFC reader/writer may query the device to determine whether its firmware is up-to-date or whether new firmware needed. For example, the NFC reader/writer may compare a firmware version number received from the device to a known current firmware version number. The firmware update method may be performed when the NFC reader/writer determines that a firmware update is needed.

In some implementations, a device may transmit a receipt for each firmware update data packet as the packet is successfully received. For example, the controller of the NFC tag may cause the receipt to be transmitted to the NFC reader/writer.

In some implementations, a retry mechanism may be implemented for individual data packets or for an entire firmware image when it is determined that a data packet or an entire firmware image has not been successfully received.

In some implementations, additional packet header information and CRC values may be transmitted by the controller of the NFC tag once all the firmware update data packets have been received. For example, the additional information may relate to a firmware image or data for an attached peripheral device.

The method 500, may be embodied on a non-transitory computer readable medium, for example, but not limited to, a memory or other non-transitory computer readable medium known to those of skill in the art, having stored therein a program including computer executable instructions for making a processor, computer, or other programmable device execute the operations of the methods.

Figure 6:
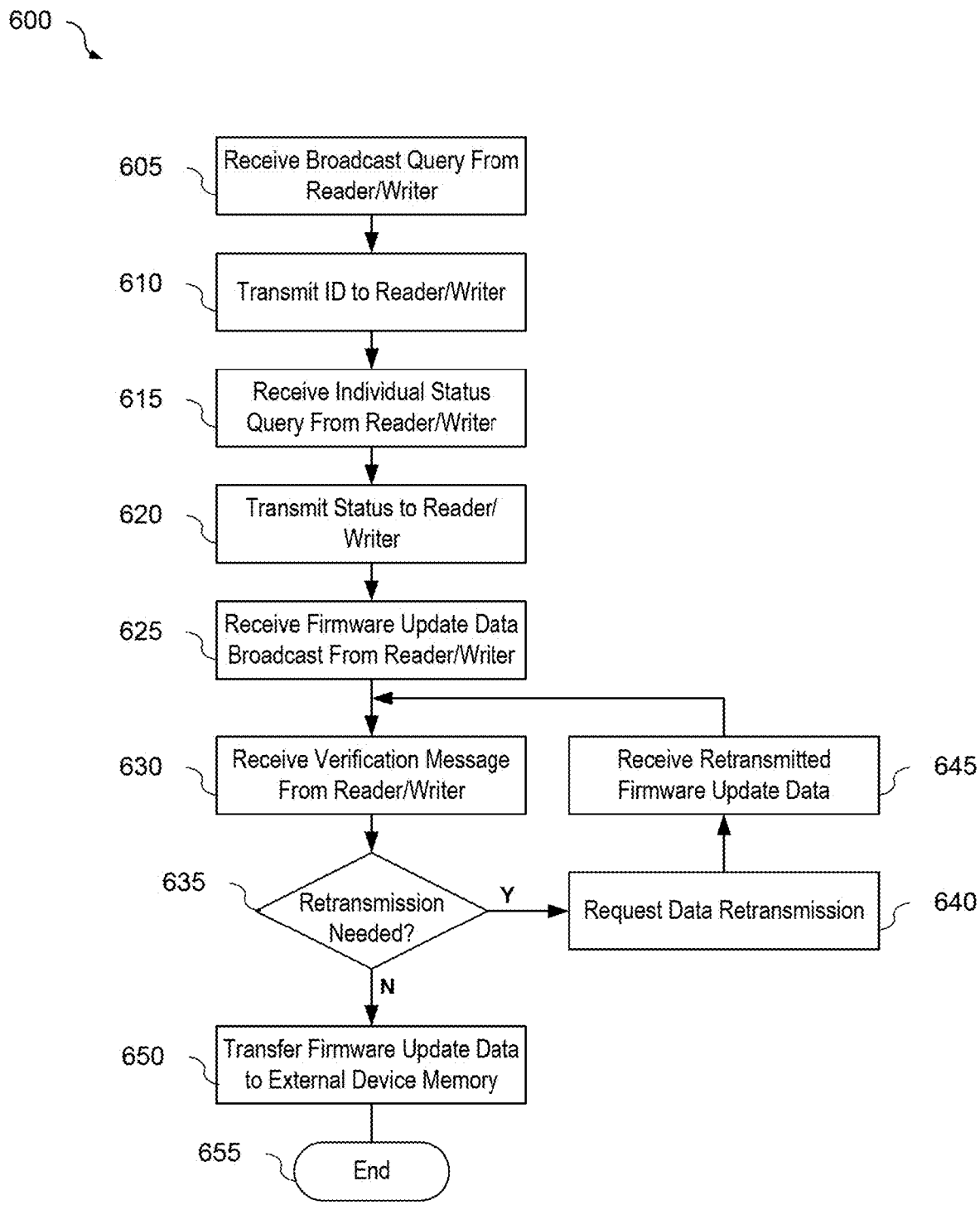
FIG. 6 is a flowchart illustrating an example of a method for receiving firmware updates or configuration updates by devices in a pallet according to aspects of the present disclosure.

FIG. 6 is a flowchart illustrating an example of a method 600 for receiving firmware updates or configuration updates by devices in a pallet according to aspects of the present disclosure. Each of the devices in the pallet may include an NFC tag, a device processor, and a device external memory. Referring to FIG. 6, at block 605, the devices in the pallet may receive a query from an NFC reader/writer requesting the unique IDs of each of the devices.

At block 610, each device may transmit an ID to the reader/writer. Each device that receives the broadcast message from the NFC reader/writer may respond with its unique ID. The NFC reader/writer may store the unique IDs of the responding devices.

At block 615, the devices on the pallet may receive individual status queries from the NFC reader/writer. Each device that responded to the NFC reader/writer with a unique ID may receive an individual status query from the NFC reader/writer requesting the status of the device indicating whether the device is capable of harvesting sufficient energy from the RF field to power the device processor and device external memory.

At block 620, the devices may transmit status to the NFC reader/writer. Each device receiving an individual status request may transmit its energy harvesting status to the NFC reader/writer. The NFC reader/writer may receive the status and store, for example in a memory, the energy harvesting status corresponding to the unique device ID of each responding device.

At block 625, the devices may receive broadcast data. The broadcast data may be firmware update data broadcast by the NFC reader/writer. Each device having sufficient energy harvesting capability may receive the firmware update data. The firmware update data may be stored in the memory (e.g., the memory 244) of the NFC tag as it is received.

At block 630, a verification message may be received from the NFC reader/writer. The verification messages only to devices with IDs that previously indicated the capability to harvest sufficient energy to power the device processor and device external memory.

At block 635, it may be determined whether retransmission of data is needed. The device processor may determine whether the firmware update data was successfully received. In some cases, algorithms may be implemented by the device processor to silence (e.g., prevent further transmissions by the device) a device that successfully received the firmware update data, or cause the device to cease energy harvesting.

In response to determining that retransmission of data is needed (635-Y), at block 640, the data may be retransmitted. For example, if the device processor determines that data packets are missing, a CRC value is incorrect, or the data fails another check, the device processor may cause the NFC tag to generate a data retransmission request to the NFC reader/writer.

At block 645, the retransmitted firmware update data may be received. The data may be received by the individual device having the unique ID associated with the retransmission request. The method may continue at block 630.

In response to determining that retransmission of data is not needed (635-N), at block 650, the firmware update data may be transferred to the device external memory. Once the data has been received by the NFC tag of a device having sufficient energy harvesting capability, the device processor may cause the firmware update data stored in the memory of the NFC tag to be transferred to the device external memory. The firmware update data may be a full firmware image or may be a differential firmware image.

At block 655, the method may end. The devices on the pallet may power down when the RF field generated by the NFC reader/writer is removed.

In some cases, it may not be possible to communicate with all of the devices on the pallet with the NFC antennas in one position. In such cases, the NFC antennas may be repositioned along a dimension, for example, a dimension of the pallet approximately perpendicular to a plane of the antenna loop or coil, and the method repeated until communication has been successfully achieved with all of the palletized devices.

The specific operations illustrated in FIG. 6 provide a particular method for receiving firmware updates by devices in a pallet according to an embodiment of the present disclosure. Other sequences of operations may also be performed according to alternative embodiments. For example, alternative embodiments of the present disclosure may perform the operations outlined above in a different order. Moreover, the individual operations illustrated in FIG. 6 may include multiple sub-operations that may be performed in various sequences as appropriate to the individual operation. Furthermore, additional operations may be added or removed depending on the particular applications.

The method 600, may be embodied on a non-transitory computer readable medium, for example, but not limited to, a memory or other non-transitory computer readable medium known to those of skill in the art, having stored therein a program including computer executable instructions for making a processor, computer, or other programmable device execute the operations of the methods.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method for providing data to a group of devices on a pallet, the method comprising:
   positioning a set of near field communication (NFC) antennas at different locations around a perimeter of the pallet, each antenna of the set of NFC antennas being configured to surround the pallet;
   broadcasting, by an NFC reader/writer utilizing the set of NFC antennas, an identification command simultaneously to the group of devices on the pallet, each device of the group of devices including an NFC tag storing a unique identification (ID) indicator;
   receiving, by the NFC reader/writer, unique ID indicators from each device of the group of devices that receives the identification command;
   transmitting, by the NFC reader/writer, individual commands to each device of the group of devices based on the unique ID indicator to enable energy harvesting by the NFC tag, wherein NFC tags for each device of the group of devices harvests energy from transmissions by the NFC reader/writer, wherein energy harvested by each device provides power to operate a processor of the device and a nonvolatile memory of the device in a low power mode;
   broadcasting, by the NFC reader/writer, data to the group of devices, wherein the data is stored in a memory of the NFC tag of each of the devices, and
   transmitting, by the NFC reader/writer, a verification message to verify that the data was successfully received by interrogating each device individually based on the unique ID indicator.

2. The method of claim 1, further comprising:
   in response to determining that the data was not successfully transferred to a device, retransmitting, by the NFC reader/writer, the data to the device based on the unique ID indicator of the device.

3. The method of claim 1, wherein each device enters a sleep mode between communications with the NFC reader/writer to conserve power.

4. The method of claim 1, wherein the data is a full firmware image or a full configuration update for the device.

5. The method of claim 1, wherein the data is a differential firmware image or a partial configuration update for the device.

6. The method of claim 1, further comprising sequentially energizing subsets of the set of NFC antennas to communicate with the group of devices on the pallet.

7. The method of claim 1, further comprising energizing each antenna of the set of NFC antennas concurrently to communicate with the group of devices on the pallet.

8. The method of claim 1, further comprising communicating with a different group of devices on the pallet by repositioning the set of NFC antennas along a dimension of the pallet.

9. The method of claim 1, further comprising loading the devices on the pallet with an antenna of the NFC tag of each device in a plane parallel to an antenna of the set of NFC antennas.

10. The method of claim 1, wherein the devices loaded on the pallet are electric meters, gas meters, or water meters.

11. A system for providing data to multiple devices on a pallet, the system comprising:
    a set of near field communication (NFC) antennas positioned at different locations around a perimeter of the pallet, each antenna of the set of NFC antennas being configured to surround the pallet; and
    an NFC reader/writer in communication with the set of NFC antennas, the NFC reader/writer configured to:
    broadcast, utilizing the set of NFC antennas, an identification command simultaneously to the multiple devices on the pallet, each of the multiple devices including an NFC tag storing a unique identification (ID) indicator;
    receive, by the NFC reader/writer, unique ID indicators from each device of the multiple devices that receives the identification command;
    transmit individual commands to each of the multiple devices based on the unique ID indicator to enable energy harvesting by the NFC tag, wherein NFC tags for each of the multiple devices harvest energy from transmissions by the NFC reader/writer, wherein energy harvested by each device provides power to operate a processor of the device and a nonvolatile memory of the device in a low power mode;
    broadcast data to the multiple devices, wherein the data is stored in a memory of the NFC tag of each of the devices, and
    transmit a verification message to verify that the data was successfully received by interrogating each device individually based on the unique ID indicator.

12. The system of claim 11, wherein each antenna of the set of NFC antennas comprises a loop-type antenna or a coil-type antenna.

13. The system of claim 11, wherein the NFC reader/writer is further configured to
    determine, based on a response to the verification message, that the data was not successfully transferred to a device; and retransmit the data to the device based on the unique ID indicator of the device.

14. The system of claim 11, wherein the data is a full firmware image or a full configuration update for the device.

15. The system of claim 11, wherein the data is a differential firmware image or a partial configuration update for the device.

16. The system of claim 11, wherein the NFC reader writer is further configured to:
sequentially energize subsets of the set of NFC antennas to communicate with the multiple devices on the pallet.

17. The system of claim 11, wherein the NFC reader writer is further configured to:
energize each antenna of the set of NFC antennas concurrently to communicate with the multiple devices on the pallet.

18. The system of claim 11, wherein the set of NFC antennas is repositioned along a dimension of the pallet to communicate with a different group of devices on the pallet.

19. The system of claim 11, wherein the multiple devices are loaded on the pallet with an antenna of the NFC tag of each device in a plane parallel to an antenna of the set of NFC antennas.

20. The system of claim 11, wherein the multiple devices on the pallet are electric meters, gas meters, or water meters.

* * * * *